United States Patent [19]

Shirai

[11] Patent Number: 6,044,281

[45] Date of Patent: Mar. 28, 2000

[54] CORDLESS TELEPHONE SET HAVING CHARGING TERMINAL CONFIGURED FOR HOLDING HANDSET

[75] Inventor: Toshiaki Shirai, Narashino, Japan

[73] Assignee: Uniden Corporation, Tokyo, Japan

[21] Appl. No.: 08/696,455

[22] Filed: Aug. 14, 1996

[30] Foreign Application Priority Data

Nov. 28, 1995 [JP] Japan .................................. 7-309575

[51] Int. Cl.[7] ................................ H04B 1/38; H04Q 7/20
[52] U.S. Cl. ........................... 455/573; 455/572; 455/90; 455/462; 320/114; 320/115
[58] Field of Search .................................. 455/462, 466, 455/571, 572, 573, 574, 575, 90, 550, 403; 320/108, 113, 115, 110, 114, 107; 379/426, 428, 433, 434, 438, 440, 441, 447, 449, 450, 453–455; D14/142, 145, 251, 253, 240, 140, 138; 439/848, 593

[56] References Cited

U.S. PATENT DOCUMENTS

| D. 319,061 | 8/1991 | Powell et al. ........................... D14/240 |
| 3,418,552 | 12/1968 | Holmes .................................... 320/115 |
| 5,151,643 | 9/1992 | Emmert et al. ......................... 320/115 |
| 5,229,701 | 7/1993 | Leman et al. ............................ 455/90 |
| 5,256,955 | 10/1993 | Tomura et al. .......................... 320/113 |
| 5,334,076 | 8/1994 | Shinozuka ............................... 320/115 |
| 5,347,208 | 9/1994 | Iida ......................................... 320/113 |
| 5,479,486 | 12/1995 | Saji ......................................... 455/573 |
| 5,506,489 | 4/1996 | Abbott et al. ........................... 320/108 |
| 5,515,420 | 5/1996 | Urasaka et al. ......................... 455/462 |
| 5,519,776 | 5/1996 | Kodman .................................. 379/435 |
| 5,594,314 | 1/1997 | Hagiuda et al. ......................... 320/113 |
| 5,602,458 | 2/1997 | Dowe ...................................... 320/115 |
| 5,656,914 | 8/1997 | Nagele et al. ............................ 320/113 |
| 5,664,973 | 9/1997 | Emmert et al. ......................... 439/862 |

FOREIGN PATENT DOCUMENTS

| 1-236753 | 9/1989 | Japan .............................. H04M 1/02 |
| 3-247058 | 5/1991 | Japan .............................. H04M 1/00 |
| 3-51537 | 5/1991 | Japan .............................. H04M 1/02 |
| 3-120152 | 12/1991 | Japan .............................. H04M 1/02 |
| 4-43049 | 4/1992 | Japan .............................. H04M 1/02 |
| 4-45319 | 10/1992 | Japan .............................. H04M 1/02 |
| 4-126442 | 11/1992 | Japan .............................. H04M 1/02 |
| 4-50682 | 11/1992 | Japan .............................. H04M 1/02 |
| 5-130183 | 5/1993 | Japan .............................. H04M 1/02 |
| 5-36952 | 5/1993 | Japan .............................. H04M 1/02 |
| 5-167498 | 7/1993 | Japan .............................. H04M 7/26 |
| 5-55649 | 7/1993 | Japan .............................. H04M 1/02 |
| 5-268307 | 10/1993 | Japan .............................. H04M 1/02 |
| 5-40599 | 10/1993 | Japan .............................. H04B 7/26 |
| 5-316178 | 11/1993 | Japan .............................. H04M 1/02 |
| 5-327583 | 12/1993 | Japan .............................. H04M 7/26 |
| 5-97152 | 12/1993 | Japan .............................. H04M 1/11 |

OTHER PUBLICATIONS

English–language Abstract of Japanese Laid–Open Application No. 1–236753A, date unknown.
English–language Abstract of Japanese Laid–Open Application No. 3–247058A, date unknown.
English–language Abstract of Japanese Laid–Open Application No. 5–130183A, date unknown.
English–language Abstract of Japanese Laid–Open Application NO. 5–167498A, date unknown.
English–language Abstract of Japanese Laid–Open Application No. 5–268307A, date unknown.
English–language Abstract of Japanese Laid–Open Application No. 5–316178A, date unknown.
English language Abstract of Japanese Laid–Open Application No. 5–327583, date unknown.

*Primary Examiner*—Dwayne D. Bost
*Assistant Examiner*—Tracy M. Legree
*Attorney, Agent, or Firm*—McDermott, Will & Emery

[57] ABSTRACT

A cordless telephone set with a handset to be placed on a charger for a secondary battery to be charged wherein the handset has a concave section on its junction surface with the charger and also has a terminal provided on a side wall of the concave section and projecting from the side wall, the charger has a convex power supply terminal on its junction surface with the handset, and the projecting terminal on the side all of the concave section of the handset is engaged in a side wall of the convex power supply terminal of the charger for electric connection.

8 Claims, 4 Drawing Sheets

FIG. 2A
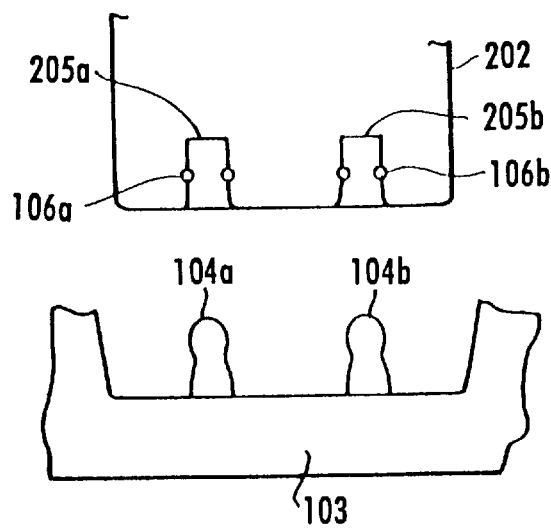
FIG. 2B
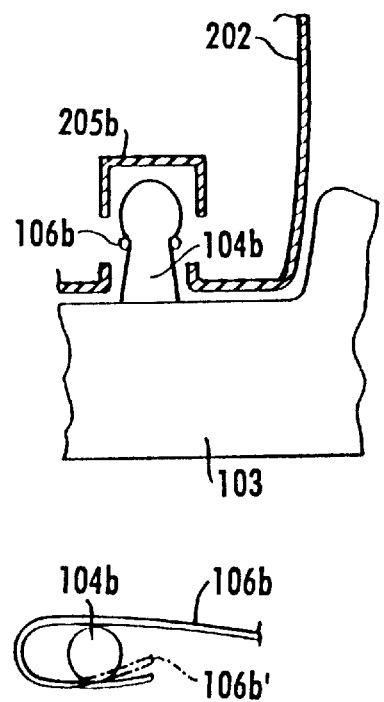
FIG. 2C

CORDLESS TELEPHONE SET HAVING CHARGING TERMINAL CONFIGURED FOR HOLDING HANDSET

FIELD OF THE INVENTION

The present invention relates to a cordless telephone set with a hand set to be placed on a charger for a secondary battery in the handset to be charged, and more particularly to a cordless telephone set having a charging terminal also functioning as a section for prevention of falling which enables reduction of space as well as of costs and hardly falls down even if a large contact pressure is loaded to the charging terminal, thus insuring charging.

BACKGROUND OF THE INVENTION

Construction of the conventional type of cordless telephone set with an upright handset to be placed on a charger for a secondary battery in said handset to be charged is, for instance, as shown in FIGS. 4A and 4B. Both the two handsets shown in these figures have construction for preventing the upright handset from falling down, and a terminal for charging and a power supply terminal are provided separately.

In the first example of the conventional technology shown in FIG. 4A, a magnetizing plate 404 provided in the handset 402 and a magnet 405 provided in the charger 403 magnetically attract each other, thus a function to prevent the handset 402 from falling being realized.

In the second example of the conventional technology shown in FIG. 4B, a concave section 414 provided in a bottom surface of the handset 412 is engaged with a convex section 415 provided on an upper surface of the charger 413. Thus, a function to prevent the handset 412 from falling being realized.

However, in the cordless telephone sets in the first and second examples of the conventional technology, construction for preventing the upright handset from falling is provided separately from the terminal for charging and the power supply terminal, which makes it difficult to make a size of the telephone set smaller and to reduce the costs.

In the cordless telephone set in the second example of the conventional technology, a tare weight of the handset loaded to the charging terminal is utilized, so that, when a contact pressure for the terminal is increased, the handset falls, which makes it difficult to charge a secondary battery therein under stable conditions.

BRIEF DESCRIPTION OF THE DRAWINGS

FIGS. 2A to 2C are explanatory views for explanation of construction of a charging terminal in the cordless telephone set according to the embodiment, wherein FIG. 2A is cross-section of the engaging section, FIG. 2B is an enlarged cross-sectional view of the engaging section, and FIG. 2C is a cross-sectional view of the engaging section viewed from the direction in which the convex power supply terminal of the charge is engaged.

FIGS. 4A and 4B are explanatory views for explanation of construction for prevention of falling in a conventional type of cordless telephone set, wherein FIG. 4A shows a first example of conventional technology, while FIG. 4B shows a second example of conventional technology.

SUMMARY OF THE INVENTION

It is an object of the present invention to provide a cordless telephone set having a charging terminal also functioning as a section for prevention of falling to enable reduction of space and costs which does not fall even if a contact pressure to the charging terminal increases and insures charging under stable conditions.

In the cordless telephone set according to the invention, the handset has a concave section on its junction surface with a charger and also has a terminal provided on a side wall of the concave section and projecting from the side wall, the charger has a convex power supply terminal on its junction surface with said handset, and the charging terminal is electrically connected to the charger by engaging the projecting terminal on the side wall of the concave section of the handset with a side wall of the convex power supply terminal of the charger, and also the charging terminal functions as a section for prevention of falling, which makes it possible to provide a cordless telephone set which does not fall even if a high contact pressure is loaded to the charging terminal and insures charging under stable conditions.

In the cordless telephone set according to the invention, a side wall of a convex power supply terminal of the charger has a concave section for engaging with a projecting terminal provided on a side wall of a concave section of the handset, so that more secure engagement is insured between the projecting terminal of the handset and the convex projecting terminal of the charger.

In the cordless telephone set according to the invention, a projecting terminal provided on a side wall of a concave section of the handset has a U-shaped form when viewed from the direction in which a convex power supply terminal of the charger is engaged in, and a distance between two legs of the U-shaped section when not engaged is smaller than a diameter of a convex power supply terminal of the charger, so that more secure engagement between the projecting terminal of the hand set and the convex power supply terminal of the charger is insured because of the elasticity of the U-shaped projecting terminal trying to return to the original form.

DESCRIPTION OF THE PREFERRED EMBODIMENTS

Next, a detailed description is made for an embodiment of a cordless telephone set according to the present invention with reference to the related drawings.

Figure 1:
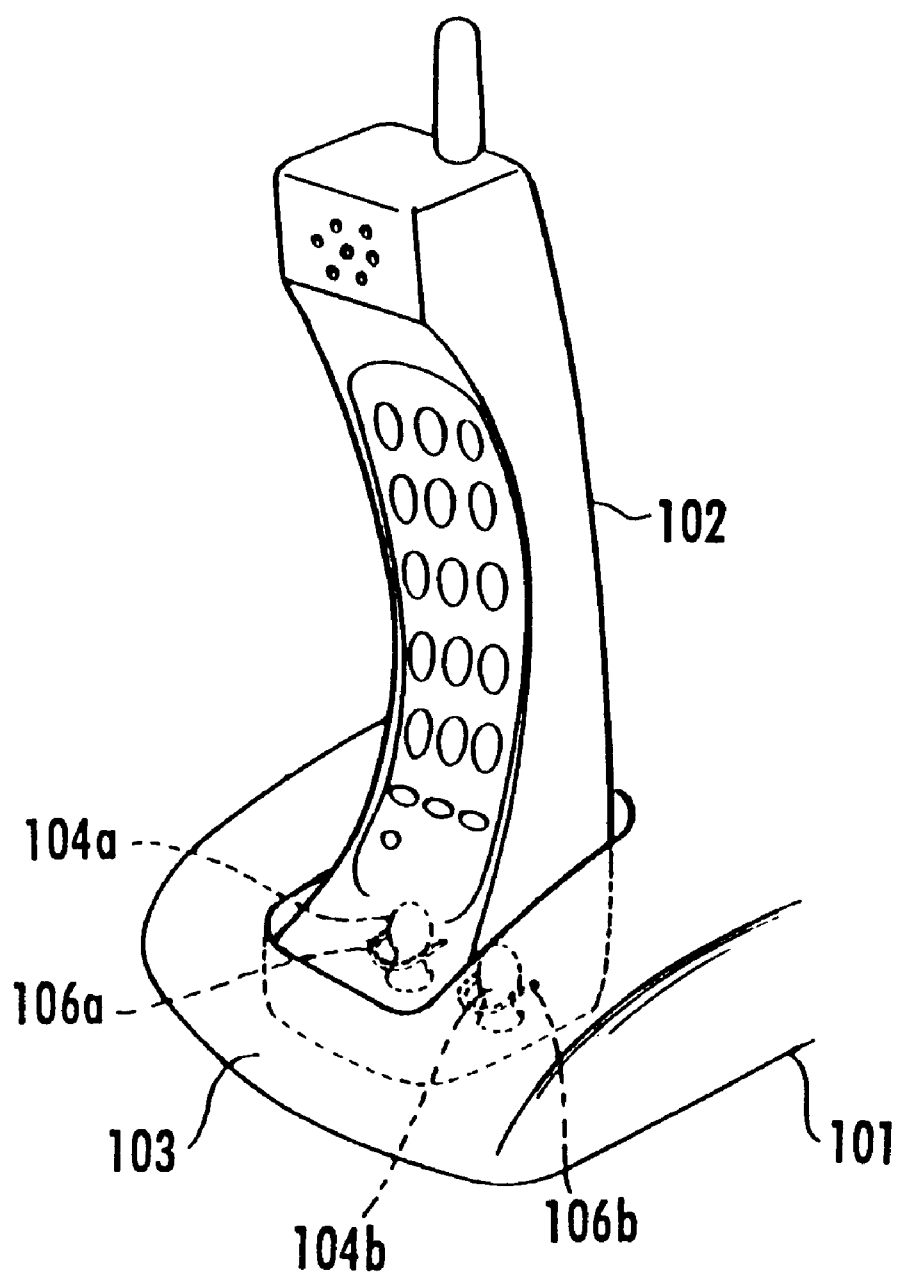
FIG. 1 is a perspective view showing a cordless telephone set according to one embodiment of the present invention.

FIG. 1 is a perspective view showing a cordless telephone set according to an embodiment of the present invention. FIGS. 2A to 2C are explanatory views showing construction of a charging terminal in the cordless telephone set according to the embodiment. FIG. 2A is a cross-sectional view of an engaging section, FIG. 2B is an enlarged cross-sectional view of the engaging section, and FIG. 2C is a cross-sectional view of the engaging section viewed from the direction in which a convex power supply terminal of a charger is engaged. It should be noted that the cordless telephone set according to the present invention has an upright handset to be placed on a charger for a secondary battery in the handset to be charged.

In FIG. 1 and FIGS. 2A to 2C, the cordless telephone set according to the present invention has a case 202 for a handset 102 in which concave sections 205a and 205b are provided in a surface functioning as a junction surface with the charger 103 when the handset 102 is placed on the charger 103, and also has terminals 106a and 106b provided in side walls of the concave sections 205a and 205b and projecting from said side walls, and the charger 103 in the base side 101 has a charging terminal construction having convex power supply terminals 104a and 104b on the junction surface with the hand set 102.

Namely, in the cordless telephone set according to the present invention, when a battery in the handset is to be charged, the projecting terminals 106a and 106b provided on side walls of the concave sections 205a and 205b of the handset 102 are engaged with side walls of the convex power supply terminals 104a and 104b of the charger 103 to establish electric connection, thus charging being executed.

Also as shown in FIG. 2B, side walls of the convex power supply terminal 104a and 104b of the charger 103 have convex sections engaging the projecting terminals 106a and 106b on the side walls of the concave sections 205a and 205b of the handset 102. With this configuration, more secure engagement is insured between the projecting terminals 106a and 106b of the handset 102 and the convex power supply terminals 104a and 104b of the charger 103.

Furthermore as shown in FIG. 2C, the projecting terminals 106a and 106b provided on side walls of the concave sections 205a and 205b of the handset 102 have sections having a U-shaped form (hair-pin forms) when viewed from the direction in which the convex power supply terminals 104a and 104b of the charger 103 are engaged.

In this configuration, a distance between two legs of the U-shaped section when not engaged is smaller than diameters of the convex power supply terminals 104a and 104b of the charger 103, so that, when the two legs of the U-shaped sections are widened and the convex power supply terminals 104a and 104b of the charger 103 are engaged therein, more secure engagement between the projecting terminals 106a and 106b of the handset 102 and the convex power supply terminals 104a and 104b of the charger 103 is insured because of the elastic force generated by the projecting terminals 106a and 106b of the U-shaped section trying to return to the original form 106b'.

Figure 3:
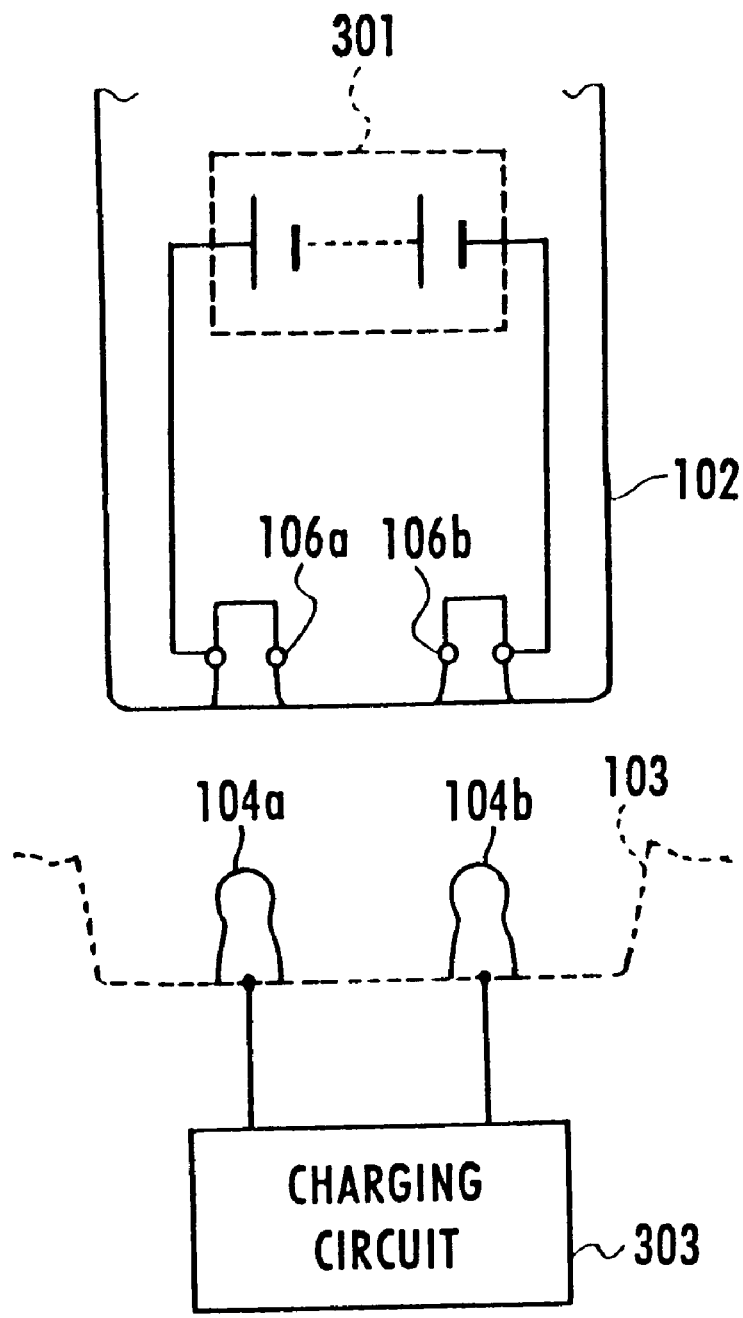
FIG. 3 is a block diagram showing a circuit for charging a secondary battery in a handset in the cordless telephone set according to the embodiment.
Figure 4A:
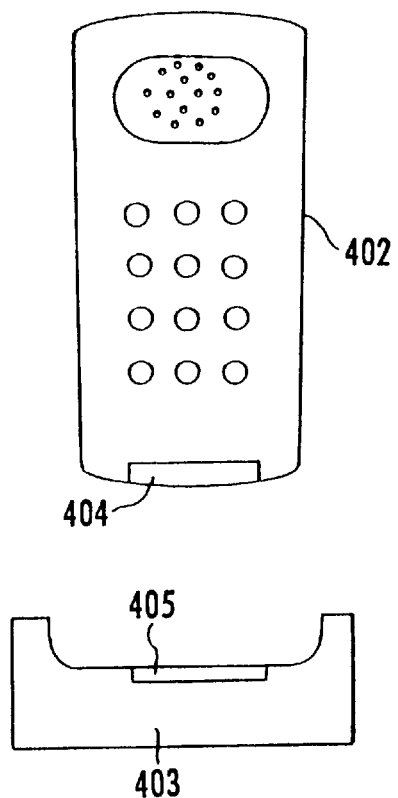
Figure 4B:
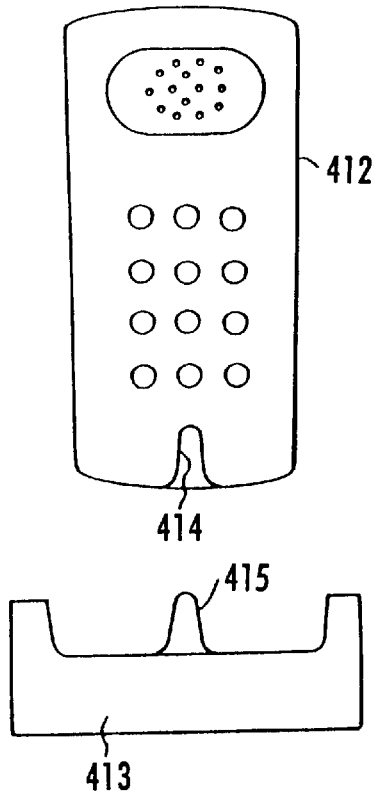

FIG. 3 is a block diagram showing a circuit for charging a secondary battery 301 in the handset 102 in the cordless telephone set according to the present invention. As shown in this figure, when the projecting terminals 106a and 106b of the handset 102 are engaged with the convex power supply terminals 104a and 104b of the charger 103, the secondary battery 301 in the handset 102 are electrically connected to the charging circuit 303 in the charger 103 and charging is started.

As described above, in the cordless telephone set according to the present embodiment, the projecting terminals 106a and 106b provided on side walls of the concave sections 205a and 205b of the handset 102 are engaged with side walls of the convex power supply terminals 104a and 104b of the charger 103 for electric connection and charging, and the charging terminal also functions as a section for prevention of falling, which makes it possible to realize a cordless telephone set in which the handset 102 does not fall even if a high contact pressure is loaded to the charging terminals 104a and 104b and a secondary battery in the handset 102 can be charged under stable conditions.

Other objects and features of this invention will become understood from the following description with reference to the accompanying drawings.

What is claimed is:

1. A cordless telephone set with a handset to be placed on a charger for a secondary battery to be charged; wherein said handset has a concave section on its junction surface with said charger and also has a terminal provided on a side wall of said concave section and projecting from said side wall;

said charger has a convex power supply terminal on its junction surface with said handset; and the projecting terminal on the side wall of the concave section of said handset is engaged in a side wall of the convex power supply terminal of said charger for electric connection.

2. A cordless telephone set according to claim 1; wherein the projecting terminal on the side wall of the concave section of said handset has a U-shaped form when viewed from the direction in which the convex power supply terminal of said charger is engaged, and a distance between two legs of said U-shaped section is smaller than a diameter of the convex power supply terminal of said charger.

3. A cordless telephone set according to claim 1; wherein the side wall of the convex power supply terminal of said charger has a concave form section which is engaged with the projecting terminal on the side wall of the concave section of said handset.

4. A cordless telephone set according to claim 3; wherein the projecting terminal on the side wall of the concave section of said handset has a U-shaped form when viewed from the direction in which the convex power supply terminal of said charger is engaged, and a distance between two legs of said U-shaped section is smaller than a diameter of the convex power supply terminal of said charger.

5. A cordless telephone set comprising:

a handset supplied by an electric power source and having at least one charging terminal electrically connected to said electric power source, and a support element for holding said handset and having a charging circuit for charging said electric power source, and at least one power supply terminal electrically connected to said charging circuit, said power supply terminal and said charging terminal having engaging means to fasten said handset to said support element, wherein said charging terminal comprises a female connector, and said power supply terminal comprises a male connector insertable into said female connector to charge said electric power source, said female connector and said male connector are configured to be clamped together so as to fasten said handset to said support element.

6. The cordless telephone set of claim 5, wherein said male connector comprises a pin having a head portion, a trunk portion, and a neck portion provided between the head and trunk portions.

7. The cordless telephone set of claim 6, wherein said female connector comprises a clamp portion for holding the neck portion of the pin to fasten said handset to said support element.

8. The cordless telephone set of claim 7, wherein said electric power source comprises a battery incorporated into said handset.

* * * * *